United States Patent
Fulks et al.

(10) Patent No.: US 7,180,255 B2
(45) Date of Patent: Feb. 20, 2007

(54) CONTROLLING THE RELEASE OF A BRUSH MOTOR WHICH HAS APPLIED A LOAD

(75) Inventors: Gary C. Fulks, Dayton, OH (US); Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/043,517

(22) Filed: Jan. 26, 2005

(65) Prior Publication Data

US 2006/0175994 A1 Aug. 10, 2006

(51) Int. Cl.
*H02P 7/00* (2006.01)
*G01R 19/00* (2006.01)

(52) U.S. Cl. .............. 318/138; 318/600; 318/603; 318/608; 318/612; 324/117 R; 324/117 H

(58) Field of Classification Search ........ 318/541, 318/283, 439, 138, 600, 603, 612, 608; 324/117 R, 324/117 H
See application file for complete search history.

(56) References Cited

U.S. PATENT DOCUMENTS

| | | | |
|---|---|---|---|
| 3,617,836 A | | 11/1971 | Henry |
| 4,037,882 A | * | 7/1977 | Taylor ............... 303/178 |
| 4,061,402 A | * | 12/1977 | Peterson et al. ....... 303/122.06 |
| 4,061,403 A | * | 12/1977 | Peterson et al. ........ 303/157 |
| 4,514,670 A | * | 4/1985 | Fassel et al. ........... 318/467 |
| 4,969,756 A | * | 11/1990 | Villec et al. ........... 388/815 |
| 5,083,075 A | * | 1/1992 | Sato et al. ............ 318/640 |
| 5,120,023 A | * | 6/1992 | Kawabata ............ 254/275 |
| 5,185,686 A | * | 2/1993 | Hansen et al. .......... 361/45 |
| 5,296,802 A | * | 3/1994 | Beranger et al. ...... 324/117 R |
| 5,385,394 A | * | 1/1995 | Leppek et al. ......... 303/115.2 |
| 5,473,244 A | * | 12/1995 | Libove et al. ......... 324/126 |
| 5,872,434 A | * | 2/1999 | Hill .................. 318/159 |
| 6,326,757 B1 | * | 12/2001 | Aoki et al. ........... 318/599 |
| 6,438,193 B1 | * | 8/2002 | Ko et al. ............. 377/24.1 |
| 6,781,359 B2 | * | 8/2004 | Stauth et al. ......... 324/117 R |
| 6,970,761 B2 | * | 11/2005 | Kerner et al. ......... 700/170 |
| 2004/0002775 A1 | * | 1/2004 | Kerner et al. ......... 700/28 |
| 2004/0056647 A1 | * | 3/2004 | Stauth et al. ......... 324/76.11 |
| 2004/0059479 A1 | | 3/2004 | Fleming et al. |
| 2004/0069580 A1 | | 4/2004 | Fleming et al. |
| 2004/0164716 A1 | * | 8/2004 | Walter et al. ......... 322/8 |
| 2004/0196024 A1 | * | 10/2004 | Stauth et al. ......... 324/117 R |
| 2004/0238299 A1 | | 12/2004 | Ralea et al. |
| 2004/0249607 A1 | * | 12/2004 | Kattwinkel ........... 702/183 |
| 2005/0046271 A1 | * | 3/2005 | Suzuki et al. ......... 303/20 |

* cited by examiner

Primary Examiner—Paul Ip
(74) Attorney, Agent, or Firm—Scott A. McBain

(57) ABSTRACT

A method for controlling the release of a brush motor which has applied a load includes several steps. One step includes applying a release current to the brush motor to rotate the brush motor in a direction toward releasing the applied load of the brush motor. Another step includes sensing the commutator bar ripple current of the brush motor. Another step includes determining when to remove the release current using at least the sensed commutator bar ripple current.

14 Claims, 1 Drawing Sheet

CONTROLLING THE RELEASE OF A BRUSH MOTOR WHICH HAS APPLIED A LOAD

TECHNICAL FIELD

The present invention relates generally to motors, and more particularly to controlling the release of a brush motor which has applied a load.

BACKGROUND OF THE INVENTION

Known brush motors which are rotated to apply a load and which are counter-rotated to release the application of the load include electro-mechanical-brake (EMB) brush motors used to apply and release an automotive electric park brake. Conventional methods for releasing an applied automotive electric park brake include those which control the rotationally-applied motor by sending a current to counter-rotate (release) the applied motor which depends on the output of a current sensor at the brush motor or on the output of a brake-rotor clamping-force sensor.

What is needed is an improvement in controlling the release of a brush motor which has applied a load.

SUMMARY OF THE INVENTION

A first method of the invention is for controlling the release of a brush motor which has applied a load and includes several steps. One step includes applying a release current to the brush motor to rotate the brush motor in a direction toward releasing the applied load of the brush motor. Another step includes sensing the commutator bar ripple current of the brush motor. An additional step includes determining when to remove the release current using at least the sensed commutator bar ripple current.

A second method of the invention is for controlling the release of a brush motor which has applied a load and includes steps a) through f). Step a) includes applying a release current to the brush motor through an inductor to rotate the brush motor in a direction toward releasing the applied load of the brush motor. Step b) includes sensing the release current of the brush motor, including the cyclic commutator bar ripple current portion thereof, using a current sensor whose output is a voltage which is related to the release current. Step c) includes filtering the output of the current sensor to yield substantially only the cyclic commutator bar ripple current contribution thereto. Step d) includes converting the filtered output of the current sensor into a series of voltage pulses. Step e) includes counting the number of voltage pulses. Step f) includes determining when to remove the release current based on the counted number.

A third method of the invention is for controlling the release of a bush motor which has applied a vehicle electric park brake and includes steps a) through f). Step a) includes applying a release current to the brush motor through an inductor to rotate the brush motor in a direction toward releasing the applied vehicle electric park brake. Step b) includes sensing the release current of the brush motor, including the cyclic commutator bar ripple current portion thereof, using a current sensor whose output is a voltage which is related to the release current. Step c) includes filtering the output of the current sensor to yield substantially only the cyclic commutator bar ripple current contribution thereto. Step d) includes converting the filtered output of the current sensor into a series of voltage pulses. Step e) includes counting the number of voltage pulses. Step f) includes determining when to remove the release current based on the counted number.

Several benefits and advantages are derived from one or more of the methods of the invention. In one example, current sensing occurs in the controller and not at the brush motor. In one application, using the commutator bar ripple current to determine when to remove the release current is less expensive than conventionally using the output of a current sensor at the brush motor or conventionally using the output of a brake-rotor clamping-force sensor.

DETAILED DESCRIPTION

Figure 1:
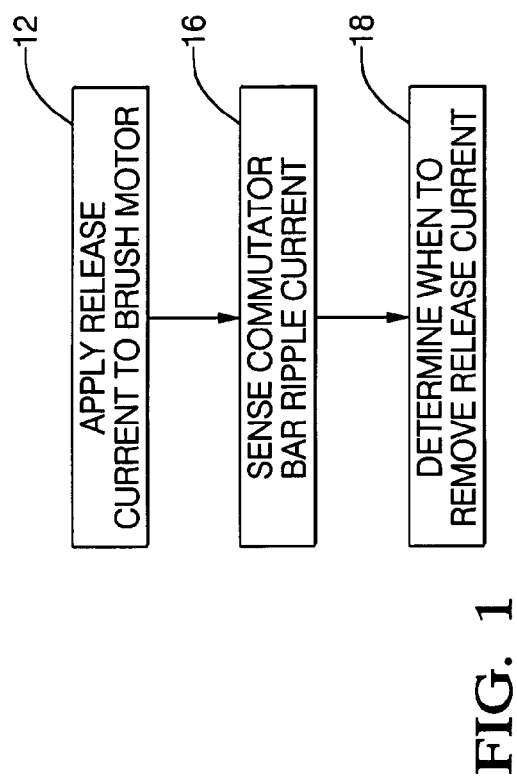
FIG. 1 is a flow chart of a method of the invention.
Figure 2:
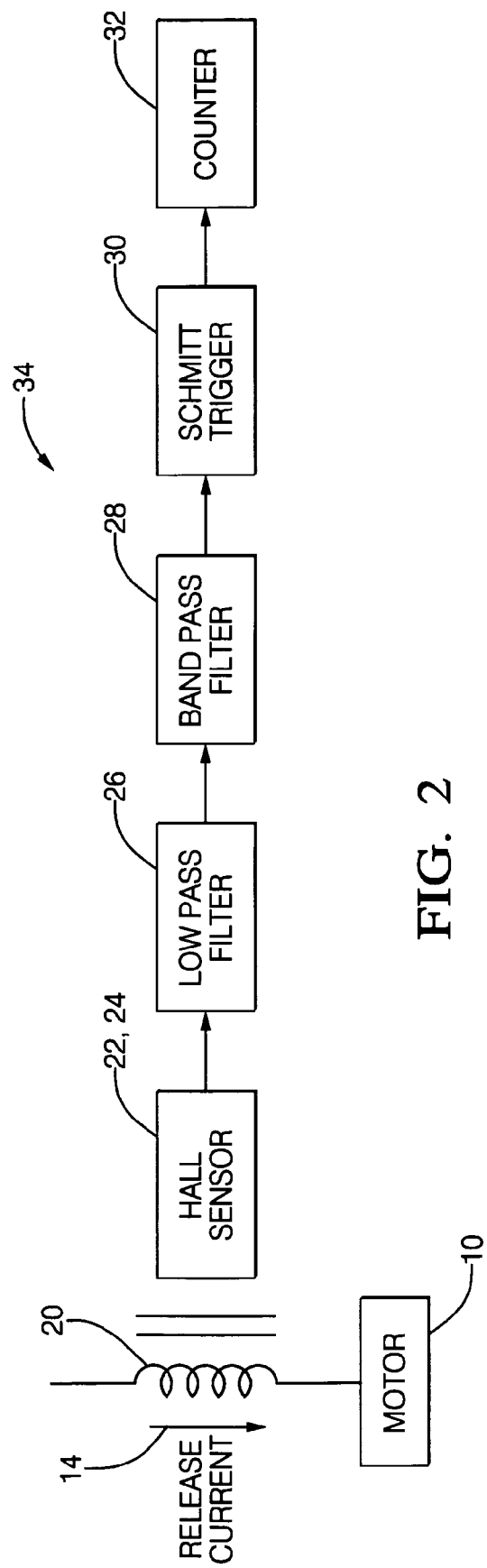
FIG. 2 is a block diagram of an embodiment of apparatus which can be used to perform the method of FIG. 1.

Referring now to the drawings, FIG. 1 illustrates a first method of the invention and FIG. 2 illustrates an embodiment of apparatus which, in one application, is used to perform an example of the method of FIG. 1. The first method is for controlling the release of a brush motor 10 which has applied a load and includes steps a) through c). Step a) is labeled as "Apply Release Current To Brush Motor" in block 12 of FIG. 1. Step a) includes applying a release current (indicated by arrow 14) to the brush motor 10 to rotate the brush motor 10 in a direction toward releasing the applied load of the brush motor 10. Step b) is labeled as "Sense Commutator Bar Ripple Current" in block 16 of FIG. 1. Step b) includes sensing the commutator bar ripple current of the brush motor 10. Step c) is labeled as "Determine When To Remove Release Current" in block 18 of FIG. 1. Step c) includes determining when to remove the release current 14 using at least the sensed commutator bar ripple current.

It is known to those skilled in the art that when current is applied to a brush motor and then measured, the measured current includes a cyclic portion which is caused by commutator-bar action in the brush motor and which is known as the commutator bar ripple current. There are 2N cycles of commutator bar ripple current for each revolution of a brush motor having 2N commutator bars and N poles. For example, there are eight cycles of commutator bar ripple current for each revolution of a brush motor having eight commutator bars and four poles.

In one illustration of the first method, the brush motor 10 is a vehicle-electric-park-brake brush motor. Other illustrations are left to the artisan.

In one implementation of the first method, step b) detects and counts a number corresponding to the number of cycles of the commutator bar ripple current, and step c) determines when to remove the release current 14 based on the counted number. In one variation, step c) determines that the release current 14 is to be removed when the counted number reaches a predetermined value. In a different variation, step c) determines that the release current 14 is to be removed when the counted number reaches a value which depends on the applied load. In one example, the value is a higher number for a higher applied load.

In the same or a different implementation of the first method, step a) applies the release current 14 to the brush motor 10 through an inductor 20, and step b) senses the commutator bar ripple current using at least a current sensor 22 (such as, but not limited to, a Hall sensor 24) which produces a voltage which is related to the release current 14. Other implementations are left to the artisan.

In one extension of the first method, there is included the step of removing the release current based on step c).

A second method of the invention is for controlling the release of a brush motor 10 which has applied a load and includes steps a) through f). Step a) includes applying a release current 14 to the brush motor 10 through an inductor 20 to rotate the brush motor 10 in a direction toward releasing the applied load of the brush motor 10. Step b) includes sensing the release current 14 of the brush motor, including the cyclic commutator bar ripple current portion thereof, using a current sensor 22 whose output is a voltage which is related to the release current 14. Step c) includes filtering the output of the current sensor 22 to yield substantially only the cyclic commutator bar ripple current contribution thereto. Step d) includes converting the filtered output of the current sensor 22 into a series of voltage pulses. Step e) includes counting the number of voltage pulses. Step f) includes determining when to remove the release current based on the counted number.

In one employment of the second method, step b) uses a Hall sensor 24. In one variation, step c) includes using a low pass filter 26 on the voltage output of the Hall sensor 24 to remove high frequency interference followed by using a band pass filter 28 to extract substantially only the cyclic voltage corresponding to the commutator bar ripple current portion of the release current 14. In one example, the signal filtering parameters of the low pass filter 26 and the band pass filter 28 are empirically determined, as is within the level of skill of the artisan. In one modification, step d) uses a Schmitt trigger 30. In one example, step e) uses a pulse counter 32. In one embodiment, the Hall sensor 24, the low pass filter 26, the band pass filter 28, the Schmitt trigger 30, and the pulse counter 32 are components of a motor controller 34 (wherein other motor-controller components have been omitted from FIG. 2 for clarity) which is used in step a) to apply the release current 14. In different implementations, other numbers and types of controller components are used, as is within the level of ordinary skill of the artisan.

In one enablement of the second method, step f) determines that the release current 14 is to be removed when the counted number reaches a predetermined value. In one implementation, the predetermined value is empirically determined from experiments establishing a single number of motor revolutions necessary to release the applied load for various expected applied loads of the particular brush motor 10 and from knowing the number of cycles of the commutator bar ripple current produced during a single revolution of the particular brush motor 10.

In a different enablement, step f) determines that the release current 14 is to be removed when the counted number reaches a value which depends on the applied load. In one example, the value is a higher number for a higher applied load. In one variation, step f) uses an equation which relates the value to the applied load. In a different variation, step f) uses a look-up table which relates the value to the applied load. In one implementation, the equation and/or the look-up table is empirically created from experiments relating the number of motor revolutions necessary to release particular applied loads of the particular brush motor 10 and from knowing the number of cycles of the commutator bar ripple current produced during a single revolution of the particular brush motor 10.

In one extension of the second method, there is included the step of removing the release current based on step f).

A third method of the invention is for controlling the release of a bush motor 10 which has applied a vehicle electric park brake and includes steps a) through f). Step a) includes applying a release current 14 to the brush motor 10 through an inductor 20 to rotate the brush motor 10 in a direction toward releasing the applied vehicle electric park brake. Step b) includes sensing the release current 14 of the brush motor 10, including the cyclic commutator bar ripple current portion thereof, using a current sensor 22 whose output is a voltage which is related to the release current. Step c) includes filtering the output of the current sensor 22 to yield substantially only the cyclic commutator bar ripple current contribution thereto. Step d) includes converting the filtered output of the current sensor 22 into a series of voltage pulses. Step e) includes counting the number of voltage pulses. Step f) includes determining when to remove the release current 14 based on the counted number.

It is noted that the employments, enablements, etc. of the second method are equally applicable to the third method.

In one application of the third method, step f) determines that the release current 14 is to be removed when the counted number reaches a value which depends on the applied load, wherein, for example, the applied load is greater to hold the vehicle in park on a hill. In this application, the value would be higher to account for the greater brake pad deformation necessary to hold the vehicle in park on the hill, as can be appreciated by those skilled in the art. This enables this application of the third method to optimize brake caliper release position and avoid brake pad drag, as can be appreciated by the artisan. In one example of the third method, the brush motor 10 is a DC (direct current) motor.

In one extension of the third method, there is included the step of removing the release current based on step f).

In the same or a different extension of the third method, before steps a) through f) are performed, there is included the step of applying the vehicle electric park brake. In one example, the controller 34 uses closed loop control for applying a current to the brush motor 10 to rotate the brush motor 10 in a direction toward applying the vehicle electric park brake. In one variation, once the controller 34 receives a command to apply the park brake, the controller 34 energizes the brush motor 10 in the brake-apply direction, waits 100 milliseconds, and begins to sample motor current. As the brake clamping force is increased, the motor current ramps up proportionally. The controller 34 de-energizes the brush motor 10 once a predetermined motor current or time limit is achieved. Other methods for controlling the apply (i.e., the load apply) of a brush motor are left to the artisan.

In one arrangement of any one or more or all of the methods of the invention, the brush motor is a DC (direct current) brush motor. In a different arrangement of any one or more or all of the methods of the invention, the brush motor is an AC (alternating current) brush motor.

Several benefits and advantages are derived from one or more of the methods of the invention. In one example, current sensing occurs in the controller and not at the brush motor. In one application, using the commutator bar ripple current to determine when to remove the release current is less expensive than conventionally using the output of a current sensor at the brush motor or conventionally using the output of a brake-rotor clamping-force sensor.

The foregoing description of several methods of the invention has been presented for purposes of illustration. It is not intended to be exhaustive or to limit the invention to the precise steps and forms disclosed, and obviously many modifications and variations are possible in light of the above teaching. It is intended that the scope of the invention be defined by the claims appended hereto.

The invention claimed is:

1. A method for controlling the release of a brush motor which has applied a load comprising the steps of:
   a) applying a release current to the brush motor through an inductor to rotate the brush motor in a direction toward releasing the applied load of the brush motor;
   b) sensing the release current of the brush motor, including a cyclic commutator bar ripple current portion thereof, using a current sensor whose output is a voltage which is related to the release current;
   c) filtering the output of the current sensor to yield substantially only the cyclic commutator bar ripple current contribution thereto;
   d) converting the filtered output of the current sensor into a series of voltage pulses;
   e) counting the number of voltage pulses; and
   f) determining when to remove the release current based on the counted number.

2. The method of claim 1, wherein step b) uses a Hall sensor.

3. The method of claim 2, wherein step d) uses a Schmitt trigger.

4. The method of claim 1, wherein step f) determines that the release current is to be removed when the counted number reaches a predetermined value.

5. The method of claim 1, wherein step f) determines that the release current is to be removed when the counted number reaches a value which depends on the applied load.

6. The method of claim 5, wherein step f) uses an equation which relates the value to the applied load.

7. The method of claim 5, wherein step f) uses a look-up table which relates the value to the applied load.

8. A method for controlling the release of a bush motor which has applied a vehicle electric park brake comprising the steps of:
   a) applying a release current to the brush motor through an inductor to rotate the brush motor in a direction toward releasing the applied vehicle electric park brake;
   b) sensing the release current of the brush motor, including a cyclic commutator bar ripple current portion thereof, using a current sensor whose output is a voltage which is related to the release current;
   c) filtering the output of the current sensor to yield substantially only the cyclic commutator bar ripple current contribution thereto;
   d) converting the filtered output of the current sensor into a series of voltage pulses;
   e) counting the number of voltage pulses; and
   f) determining when to remove the release current based on the counted number.

9. The method of claim 8, wherein step b) uses a Hall sensor.

10. The method of claim 9, wherein step d) uses a Schmitt trigger.

11. The method of claim 8, wherein step f) determines that the release current is to be removed when the counted number reaches a predetermined value.

12. The method of claim 8, wherein step f) determines that the release current is to be removed when the counted number reaches a value which depends on the applied load.

13. The method of claim 12, wherein step f) uses an equation which relates the value to the applied load.

14. The method of claim 12, wherein step f) uses a look-up table which relates the value to the applied load.

* * * * *